United States Patent
Jiang et al.

(10) Patent No.: US 8,279,900 B2
(45) Date of Patent: Oct. 2, 2012

(54) MODE-LOCKED TWO-MICRON FIBER LASERS

(75) Inventors: Shibin Jiang, Tucson, AZ (US); Qing Wang, Tucson, AZ (US); Jihong Geng, Tucson, AZ (US); Tao Luo, Tucson, AZ (US)

(73) Assignee: AdValue Photonics, Inc., Tucson, AZ (US)

( * ) Notice: Subject to any disclaimer, the term of this patent is extended or adjusted under 35 U.S.C. 154(b) by 0 days.

(21) Appl. No.: 13/113,656

(22) Filed: May 23, 2011

(65) Prior Publication Data

US 2011/0222562 A1    Sep. 15, 2011

Related U.S. Application Data

(63) Continuation-in-part of application No. 12/509,409, filed on Jul. 24, 2009, now Pat. No. 7,957,433.

(51) Int. Cl.
*H01S 3/30* (2006.01)
*H01S 3/113* (2006.01)
*H01S 3/098* (2006.01)

(52) U.S. Cl. .................................. 372/6; 372/11; 372/18
(58) Field of Classification Search ................ 372/6, 11, 372/18, 64, 68
See application file for complete search history.

(56) References Cited

U.S. PATENT DOCUMENTS

| 6,510,167 | B1 | 1/2003 | Jain et al. |
| 7,106,762 | B1 | 9/2006 | Jiang et al. |
| 7,298,547 | B1 | 11/2007 | Jiang et al. |
| 7,298,768 | B1 | 11/2007 | Jiang et al. |
| 2011/0058577 | A1 | 3/2011 | Jiang et al. |

*Primary Examiner* — Armando Rodriguez
(74) *Attorney, Agent, or Firm* — Dale F. Regelman; Quarles & Brady LLP (57) ABSTRACT

A mode-locked fiber laser comprising a multicomponent glass fiber doped with a trivalent rare-earth ion of thulium and/or holmium and including a fiber-optic based passive saturable absorber that contains an adhesive material mixed with a saturable absorbing components and is disposed along the length of an optical fiber such as to assure that a mode propagating within the fiber spatially overlaps with the volume occupied by the saturable absorbing components.

20 Claims, 6 Drawing Sheets

MODE-LOCKED TWO-MICRON FIBER LASERS

CROSS REFERENCE TO RELATED APPLICATIONS

The present application is a continuation-in-part of U.S. patent application Ser. No. 12/509,406 filed on Jul. 24, 2009 and titled Mode-Locked 2 Micron Fiber Lasers, the disclosure of which is incorporated herein in its entirety. Also incorporated by reference in its entirety is the disclosure of U.S. patent application Ser. No. 12/113,865, filed on May 1, 2008 and titled Thulium and/or Holmium Doped Silicate Glasses for Two Micron Lasers.

TECHNICAL FIELD

The present invention relates to mode-locked fiber lasers and, more particularly, to mode-locked fiber lasers generating picosecond and femtosecond pulses in the spectral region near 2 microns.

BACKGROUND ART

Mode-locking is a technique that induces a fixed phase relationships among the modes of the laser's resonant cavity. As a result of mode-locking, the lasing modes interfere and a laser is caused to produce light output in a form of laser pulses of extremely short duration, for example on the order of picoseconds ($10^{-12}$ s) or femtoseconds ($10^{-15}$ s). Because of high peak power that is achieved due to the extremely short pulse duration, a mode-locked laser can be used for a variety of applications, including materials processing, spectroscopy, sensing, medicine, and light generation through optical nonlinearity.

A mode-locked fiber laser is a specific type of mode-locked lasers that include an optical fiber, made of appropriately doped glass, as a gain medium. Typically, for this purpose, a doped silica optical fiber is used having a length of several meters because of the relatively low gain per unit length the doped silica material. Such length of the optical fiber used as gain medium imposes a limitation on the repetition rate of a pulse train output of the mode-locked fiber laser of approximately 100 MHz.

SUMMARY OF THE INVENTION

Embodiments of the present invention provide a mode-locked fiber laser system, a method for operating a mode-locked fiber laser system, and a saturable absorber for use with a mode-locked fiber laser system.

In one embodiment, a mode-locked fiber laser system includes a multicomponent-glass optical fiber having a length between 0.75 cm and 150 cm that is adapted to operate as a gain-medium the fiber laser system that generates a train of laser pulses at a wavelength between approximately 1.75 microns and 2.05 microns at a rate between 0.1 GHz and 20 GHz, preferably between 0.2 GHz and 15 GHz, and even more preferably between 0.5 GHz and 10 GHz. Alternatively, in a specific embodiment, the length of the muticomponent-glass optical fiber is 1.0 cm and 75 cm and preferably between 1.5 cm and 30 cm. The muticomponent glass of the multi-component-glass optical fiber of the system may include (i) a network former selected from the group consisting of $SiO_2$, $GeO_2$, $P_2O_5$, $B_2O_3$, and $Al_2O_3$; and/or (ii) a network intermediate including at least one of $B_2O_3$ and $Al_2O_3$; and/or (iii) a network modifier selected from the group consisting one or more of an alkali ion, an alkaline earth ion, and a transition metal ion. In addition or alternatively, the refractive index of the muticomponent glass of the multicomponent-glass optical fiber of the system is greater than 1.55 at 589 nm.

According to embodiments of the invention, the mode-locking regime of operation of the fiber laser system is achieved by using a passive saturable absorber that includes a saturable absorbing material such as at least one of metallic nano-spheres, metallic nano-wires, carbon nano-tubes, quantum dots, and graphene components. Such absorber is disposed at an optical fiber section of an embodiment to assure that a laser mode supported by the optical fiber section spatially overlaps with the saturable absorbing material. In one embodiment, the saturable absorbing material is disposed on a core portion of the optical fiber that is exposed by removing a cladding portion of the fiber. In another embodiment, a saturable absorbing material is disposed along a tapered down portion of the optical fiber.

Optionally, an embodiment of the fiber laser system includes an additional optical fiber section that is fusion-spliced with said multicomponent glass optical fiber and, in particular, fusion-spliced such as to form an all-fiber laser system in an optical cavity of which light propagates exclusively through an optical fiber medium and not through free-space.

Embodiments of the fiber laser system of the invention additionally provide a mode-locked fiber laser system that features a gain medium including a multicomponent-glass optical fiber having a length between 0.75 cm and 150 cm and two ends and at least one additional passive optical fiber that is fusion-spliced to at least one of the ends of the multicomponent-glass optical fiber. Embodiments additionally contain a pump combiner integrated with the at least one passive optical fiber, a pump laser source that is configured to deliver light through the pump combiner into the gain medium, an a reflector such as an optical thin-film stack, a fiber Bragg grating, or a fiber loop mirror defining the optical cavity of the fiber laser system of the embodiments. Embodiments also include a saturable absorber element configured to contain a saturable absorber compound (a base material impregnated with at least one of metallic nano-spheres, metallic nano-wires, carbon nano-tubes, quantum dots, and grapheme components) along the length of an optical fiber section configured to assure that a laser mode supported by the optical fiber section spatially overlaps with the volume occupied by the saturable absorbing compound. Embodiments of the fiber laser are adapted to generate laser light at a wavelength between approximately 1.75 microns and 2.05 microns.

Related embodiments provide a method for operating a mode-locked fiber laser system. A method includes transmitting light from a pump laser source through at least one optical fiber element to an optical fiber system, which contains a multicomponent-glass optical-fiber based gain medium having a length between 0.75 cm and 150 cm (preferably between 1.0 cm and 75 cm and more preferably between 1.5 cm and 30 cm), a saturable absorber and a reflector that are both in optical communication with the gain medium. The optical fiber elements of the fiber laser system are fusion-spliced with one another and, optionally, are fusion-spliced such as to create a fiber laser cavity that is devoid of free-space regions. An embodiment of the method also includes partially transmitting light incident onto the reflector to a field-of-view outside the fiber laser system in such a matter as to provide for a pulsed light output, by the optical fiber system, at a repetition rate between 0.1 GHz and 20 GHz, preferably between 0.2 GHz and 15 GHz, and even more preferably between 0.5 GHz and 10 GHz. In one specific embodiment, the act of transmitting light incident onto the reflector to a field-of-view outside the fiber laser system includes partially transmitting light at a wavelength between approximately 1.75 microns and 2.05 microns.

In a related embodiment, transmitting light through the fiber laser system includes transmitting light through a section of an optical fiber that contains at least one of metallic nano-spheres, metallic nano-wires, carbon nano-tubes, quantum dots, and grapheme components disposed to spatially overlap with the transmitted light. In one embodiment, transmitting light through the fiber laser system includes transmitting light through an optical fiber doped with at least one of trivalent holmium and trivalent thulium. In a specific embodiment, transmitting light additionally includes transmitting light through an optical fiber a material of which contains at least one of (i) a network former selected from the group consisting of $SiO_2$, $GeO_2$, $P_2O_5$, $B_2O_3$, and $Al_2O_3$; (ii) a network intermediate including at least one of $B_2O_3$ and $Al_2O_3$; and (iii) a network modifier selected from the group consisting of an alkali ion, an alkaline earth ion, and a transition metal ion.

BRIEF DESCRIPTION OF THE DRAWINGS

The invention will be more fully understood by referring to the following Detailed Description of Specific Embodiments in conjunction with the Drawings, of which.

DETAILED DESCRIPTION OF SPECIFIC EMBODIMENTS

In accordance with preferred embodiments of the present invention, methods and apparatus are disclosed for a mode-locked fiber laser that includes a multicomponent trivalent thulium ($Tm^{3+}$) and/or Holmium ($Ho^{3+}$) doped optical fiber as a gain medium and that is configured to generate a train of light pulses in a spectral region near 2 microns at a repetition rate of at least several gigahertz. As disclosed, a subject mode-locked fiber laser contains a multicomponent glass fiber comprising concentrations of $Tm^{3+}$ and $Ho^{3+}$ ions that are high enough that shorter lengths of $Tm^{3+}$ or $Ho^{3+}$-doped optical fibers, as compared with devices of the related art, can be used to achieve gain levels required for appropriate use of this pulsed fiber laser at the above-mentioned repetition rates. In other words, the length of the laser cavity of an embodiment of a mode-locked fiber laser configured according to the idea of the present invention is significantly reduced, as compared with the devices of the related art, which advantageously affords an increase in the repetition rate of the pulsed operation of such embodiments.

References throughout this specification to "one embodiment," "an embodiment," "a related embodiment," or similar language mean that a particular feature, structure, or characteristic described in connection with the referred to "embodiment" is included in at least one embodiment of the present invention. Thus, appearances of the phrases "in one embodiment," "in an embodiment," and similar language throughout this specification may, but do not necessarily, all refer to the same embodiment. It is to be understood that no portion of disclosure, taken on its own and in possible connection with a figure, is intended to provide a complete description of all features of the invention.

In addition, the following disclosure may describe features of the invention with reference to corresponding drawings, in which like numbers represent the same or similar elements wherever possible. In the drawings, the depicted structural elements are generally not to scale, and certain components are enlarged relative to the other components for purposes of emphasis and understanding. It is to be understood that no single drawing is intended to support a complete description of all features of the invention. In other words, a given drawing is generally descriptive of only some, and generally not all, features of the invention. A given drawing and an associated portion of the disclosure containing a description referencing such drawing do not, generally, contain all elements of a particular view or all features that can be presented is this view, for purposes of simplifying the given drawing and discussion, and to direct the discussion to particular elements that are featured in this drawing.

A skilled artisan will recognize that the invention may possibly be practiced without one or more of the specific features, elements, components, structures, details, or characteristics, or with the use of other methods, components, materials, and so forth. Therefore, although a particular detail of an embodiment of the invention may not be necessarily shown in each and every drawing describing such embodiment, the presence of this detail in the drawing may be implied unless the context of the description requires otherwise. In other instances, well known structures, details, materials, or operations may be not shown in a given drawing or described in detail to avoid obscuring aspects of an embodiment of the invention that are being discussed.

The described features, structures, or characteristics of the invention may be combined in any suitable manner in one or more embodiments. The invention as recited in claims appended to this disclosure is intended to be assessed in light of the disclosure as a whole.

Figure 1:
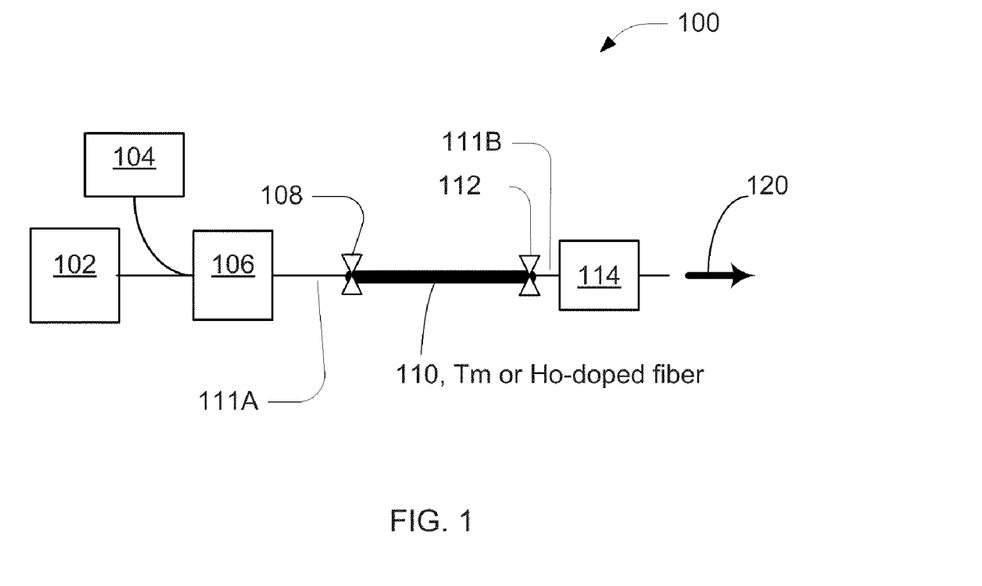
FIG. 1 is a schematic diagram of an embodiment of the mode-locked 2 micron fiber laser.

Referring now to the drawings accompanying this disclosure, FIG. 1 shows schematically, as a non-limiting example, an embodiment 100 of a mode-locked 2 micron fiber laser. The embodiment 100 includes a $Tm^{3+}$ or $Ho^{3+}$ doped optical fiber section 110 that is used as a gain medium of the embodiment of the laser and that is fusion-spliced with a pump combiner 106 and an output reflector 114. A term "fusion-splicing" generally refers to a technique by which two optical fibers are joined end-to-end using heat in such a manner that light, passing through the joined fibers, is not scattered or reflected back by the splicing joint (also referred to as a splice) formed during the fusion operation. As shown in FIG. 1, the fusion splicing joints between the doped optical fiber section 110 and outside optical fibers 111A, 111B, to which the fiber section 110 is fusion-spiced, are labeled 108 and 112. The gain medium 110 of the embodiment is pumped with a pump laser source 104, the output power of which is increased in the pump combiner 106 upon propagation towards the gain medium 110. The pump laser source 104 generally includes a laser such as, in a specific example, a diode laser, either a single-mode or a multi-mode. In a specific embodiment, the pump laser source 104 emits light at a wavelength that is substantially equal to 790 nm. In context of wavelengths, the term "substantially equal to" or approximately equal to" are intended to mean "within a ten percent (10%) band centered at the stated value".

The embodiment 100 further contains a saturable absorber 102 that is configured to be in optical communication with one end of the fiber section 110. A saturable absorber generally includes an optical component characterized by absorption (of light) the level of which decreases with increasing light intensity, particularly at high levels of optical intensity. For the intended use of embodiments of the invention such as, for example, the embodiment 100 of FIG. 1, the saturable absorber 102 may be either a passive device (for example, the one devoid of moving parts, or the one that does not have to be activated by power supply) or an active device. In a specific embodiment (not shown), the saturable absorber 102 is a semiconductor material based saturable mirror having a coating characterized by high reflectance in the vicinity of 2 microns disposed at a stack of the saturable absorber layers that are, in turn carried by a substrate material. As broadly used and described herein, the reference to a film or layer as being "carried" on or by a surface of an element refers to a film or layer that is disposed directly on the surface of an element or disposed on another coating, layer or layers that are disposed directly on the surface of the element. In another embodiment (not shown), the saturable absorber 102 has a refractive coating. Alternative embodiments of the saturable absorber are discussed below.

The other end of the gain medium fiber section 110 is optically connected with an output reflector 114 through which the embodiment 100 generates the laser light output 120. The output reflector 114 is configured to include at least one of a reflective material (such as, for example, a thin-film coating) deposited at the end of the fiber optic, an optical fiber containing a broad-band fiber Bragg grating (FBG), and a fiber loop mirror.

Figure 2:
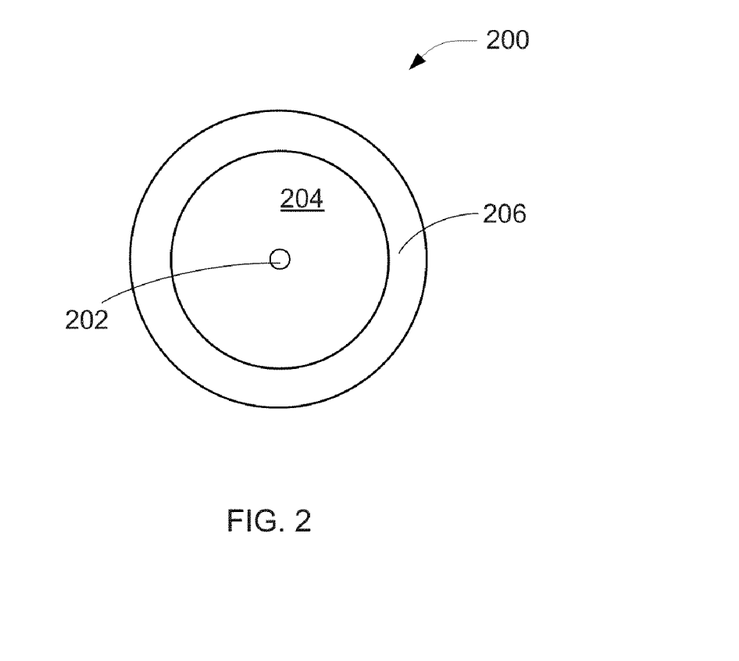
FIG. 2 is a cross-sectional view of an exemplary embodiment of a thulium-doped double-cladding optical fiber.

Turning now to FIG. 2, an exemplary embodiment of a double-cladding optical fiber 200 is shown that can be used with an embodiment of the mode-locked 2 micron fiber laser of the present invention. Optical fiber 200 is shown to have a core 202, an inner cladding 204, and an outer cladding 206. The core 202 of the fiber 200 is doped, according to the idea of the invention, with at least one of $Tm^{3+}$ and $Ho^{3+}$. The optical fiber 200 additionally comprises a glass network former, intermediates, and modifiers. As will be understood by one of ordinary skill in the art, the network structure of glass allows for the accommodation of different types of atoms that can significantly change the properties of fiber-forming glass. For example, cations can act as either network modifiers, thereby disrupting the continuity of the network, or as formers, thereby contributing to the formation of the network. Network formers have a valence greater than or equal to three and a coordination number no larger than four. Network intermediates have a lower valence and higher coordination number, as compared to the network formers.

In a related embodiment, the optical fiber 200 includes an oxide multicomponent glass. In such embodiment, the fiber 200 may, by way of a non-limiting example, include at least one of silicate glass, germanate glass, phosphate glass, borate glass, tellurite glass, bismuth glass, and aluminate glass. In such embodiment, the fiber 200 may have a glass former network including at least one of $SiO_2$, $GeO_2$, $P_2O_5$, $B_2O_3$, $TeO_2$, $Bi_2O_3$, and $Al_2O_3$. In another implementation, the fiber 200 includes a non-oxide multicomponent glass such as, for example, fluoride glass or chalcogenide glass. In another embodiment, alternatively or in addition, the optical fiber 200 contains an oxide glass network intermediate, such as, for example, aluminum oxide or boron oxide and/or an alkali-ion glass network modifier. The glass network modifier includes, for example, at least one of $Li^+$, $Na^+$, and $K^+$. In another embodiment, the optical fiber 200 includes an alkaline earth ion glass network modifier such as, for example, at least one of $Mg^{2+}$, $Ca^{2+}$, and $Ba^{2+}$. In another implementation, the optical fiber 200 may additionally include a transition metal ion glass network modifier such as, for example, at least one of $Zn^{2+}$ and $Y^{3+}$.

Disclosed multicomponent-glass embodiments of the invention advantageously differ from silica-glass-based devices of the related art in numerous ways. For example, the content of glass modifiers the related art devices and that of the present embodiments are different. The silica glass is not a multicomponent glass, but typically comprises pure $SiO_2$ without any appreciable glass network modifier. While the silica glass can be generally modified using $GeO_2$, $P_2O_2$, $B_2O_3$, and $Al_2O_3$, it is well appreciated that the properties of so modified silica glass (including physical, chemical, mechanical, and thermal properties) change dramatically when the content of a modifier exceeds about 1 weight-percent. In contradistinction, the concentration levels of rare-earth ions doping of the multicomponent glass according to embodiment of the present invention is much higher. The glass network modifiers employed in multicomponent glass of the present embodiments (such as sodium ions, potassium ions, barium ions, and calcium ions) disrupt a well-defined glass network of silica, thereby producing sites for rare-earth ions. As a result, embodiments of the invention employ multicomponent glass having more than 10 weight-percent of rare earth doping ions, while the doping concentration of silica glass is typically limited to about 1 weight-percent. Consequently, such high doping concentration of rare earth ions in laser glass enables the enhancement of laser performance of the disclosed embodiments.

Furthermore, the refractive index of glass used with embodiments of the invention can be adjusted by changing the composition of the glass. Such changes to the refractive index cause variation of a zero-dispersion wavelength of fiber optic made of glass used with the present embodiments. An ability to define a zero-dispersion wavelength in a spectral region near 2 microns enables the disclosed embodiments of a mode-locked fiber laser to generate a train of pulses that are shorter in duration than those of the related art. It was discovered that a zero-dispersion wavelength near 2 microns can be achieved, according to the embodiments of the invention, by adjusting the refractive index of the glass used with these embodiments to greater than 1.55 at 589 nm. In comparison, the refractive index of conventionally used silica glass at 589 nm is less than 1.50.

Another benefit of the embodiments of the present invention over devices of the related art can be realized through a particular way of fabrication of multicomponent-glass fiber as compared to that of a conventionally used silica fiber. According to the embodiments of the present invention, the rare-earth doped multicomponent glass fiber is fabricated using a rod-in-tube technique. In particular, a core glass rod is drilled from the rare-earth doped bulk glass, then ground and polished. A tube is then fabricated from the undoped bulk glass having a lower refractive index than that of the core rod. A fiber preform is then formed by inserting the rod into the polished tube. The preform is pulled into fiber at an elevated temperature on a fiber drawing tower. In contradistinction, the rare-earth doped silica fiber is typically fabricated using chemical vapor deposition (CVD) technique according to which, when a sufficient amount of rare-earth doped silica vapor has been deposited inside of a silica glass tube, the tube is heated and collapsed around the deposited rare-earth doped silica. The doped silica material forms the core of the fiber and the undoped silica material forms the cladding.

As a consequence of different fabrication methods employed to fabricate multicomponent-glass optical fibers used with the embodiments of the invention as compared to those used in conventional dopes silica fiber lasers, the operational characteristics of the resulting fiber lasers are drastically different. The power of a mode-locked fiber laser increases linearly with the repetition rate. Furthermore, because of the extremely short pulse width, the optical non-linearity of the glass material sets an upper limit for high-power mode-locked fiber lasers. Therefore, a fiber laser operating at a higher repetition rate produces a higher average output power. Operational properties of a mode-locked fiber laser configured with the use of a conventionally-fabricated doped silica fiber includes a pulse-train at a repetition rate that is limited to approximately 100 MHz, which defines the extent to which such fiber laser can be used.

In contradistinction, embodiments of the present invention operate at a significantly higher repetition rate. A mode-locked fiber laser of the present invention utilizes a $Tm^{3+}$ or $Ho^{3+}$ doped multicomponent glass fiber. In one embodiment, the active laser ion is $Tm^{3+}$ and the multicomponent fiber is doped with $Tm^{3+}$, resulting in emissions in a spectral region from 1.75 microns to 2.05 microns. In another embodiment, $Ho^{3+}$ is used as the laser active ion and the multicomponent glass fiber can be singly doped with $Ho^{3+}$. In another embodiment the multicomponent glass fiber is co-doped with $Ho^{3+}$ and $Tm^{3+}$, resulting in laser emissions in a spectral region from 1.95 microns to 2.2 microns. When co-doped with both ions, the $Tm^{3+}$ ions are energetically pumped to transfer energy to the $Ho^{3+}$ ions. As a result of using a $Ho^{3+}$ doped and/or $Tm^{3+}$ doped multicomponent gain fiber, the length of an embodiment of the fiber laser according to the present invention can be significantly reduced (down to several centimeters, for example less than 10 cm and preferably less than 5 cm) as compared to devices of the related art. As will be appreciated by one of ordinary skill in the art, the relationship between the pulse-repetition rate of a mode-locked fiber laser and the length of the multicomponent fiber is proportional to c/2L, where c is the speed of a fiber mode within the fiber laser cavity and L is the optical length of the fiber laser cavity. Therefore, when the length of the fiber laser cavity is about 1.5 meters, the pulse repetition rate is about 100 MHz. However, when the fiber cavity length is reduced to about 10 cm, the pulse repetition rate increases to about 1.5 GHz. In one embodiment of the present invention, the length of the multicomponent fiber gain medium is between 0.75 cm and 150 cm and a repetition rate of fiber-laser operation is between 0.1 GHz and 20 GHz. In another embodiment, a fiber laser of the invention has a multicomponent glass fiber section with a length between 1.0 cm and 75 cm and is characterized by a repetition rate between 0.2 GHz and 15 GHz. In another embodiment, the length of the multicomponent glass fiber laser cavity is between 1.5 cm and 30 cm and the laser has a repetition rate of 0.5 GHz to 10 GHz.

In one embodiment, a $Tm^{3+}$ doped silicate glass fiber is fabricated having the parameters recited in Table 1. The doping concentration is 5 weight-percent of $Tm_2O_3$. The gain-medium fiber includes a double cladding with the diameters of the core, first cladding, and second cladding being 10, 125, and 164 microns, respectively. The numerical aperture of the core and inner cladding are 0.136 and 0.581 respectively.

TABLE 1

| Glasses | Refractive Index at 589 nm | Doping | Numerical Aperture | Core (μm) | Cladding Diameter. (μm) |
|---|---|---|---|---|---|
| S-G-23 | 1.633 | 5 wt % $Tm_2O_3$ | 0.136 | 10 | |
| First Cladding | 1.6273 | | 0.581 | | 125 |
| Second Cladding | 1.5233 | | | | 164 |

The above-described double-cladding gain-medium fiber may be utilized with a pump laser source (such as the source 104 of FIG. 1) that is a multimode 800 nm diode laser the output of which is outcoupled through a 125-micron-core optical fiber. In such an embodiment, the inner cladding of the $Tm^{3+}$ doped silicate glass fiber matches the 125 micron diameter of the core of the output fiber of the pump laser source.

Figure 3:
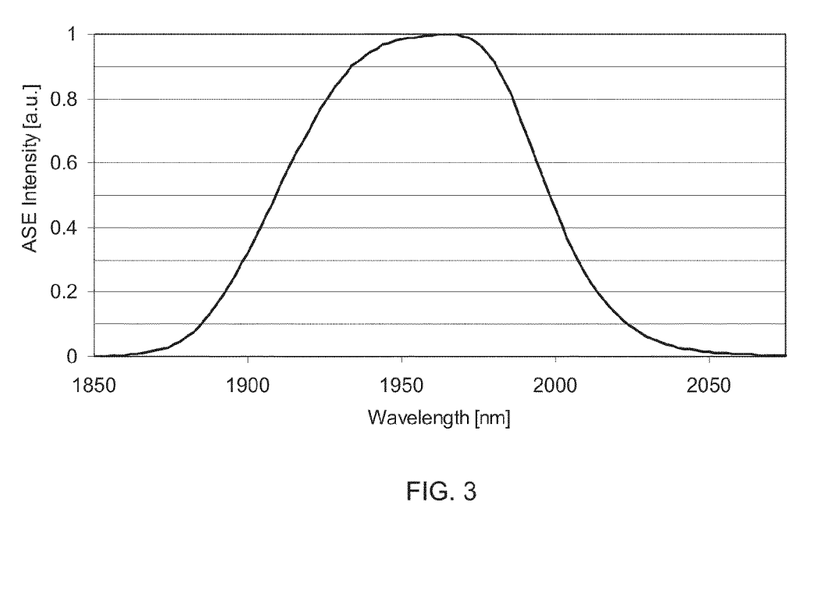
FIG. 3 shows an exemplary spectrum of amplified spontaneous emission (ASE) of thulium ions.
Figure 4:
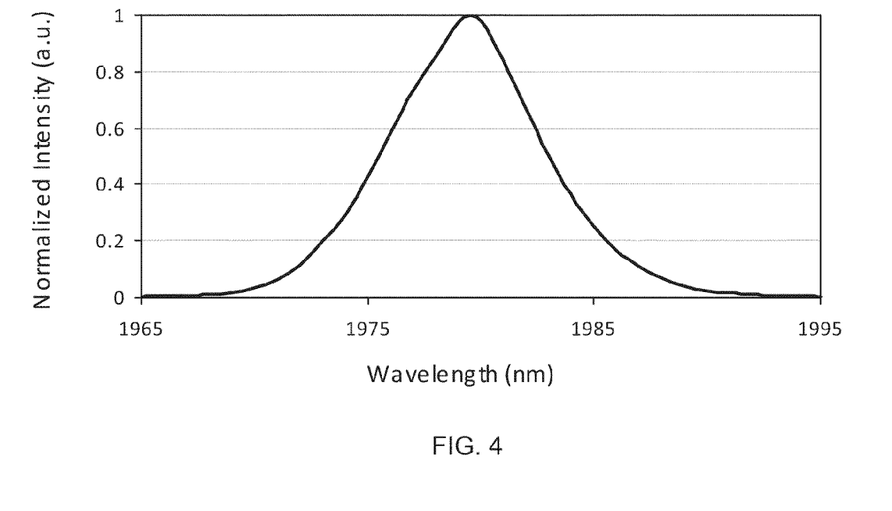
FIG. 4 shows an exemplary spectrum of an embodiment mode-locked 2 micron fiber laser according to the present invention.

FIG. 3 graphically illustrates an amplified spontaneous emission (ASE) of $Tm^{3+}$ ions as a function of wavelength. By pumping different lengths of the above-described gain-medium optical fibers with light at different intensities, embodiments of the present invention can be adapted to generate laser light output (such as the output 120 of FIG. 1) in the spectral region of about 1.75 microns to about 2.05 microns. FIG. 4 graphically illustrates a laser spectrum of a mode-locked near 2 microns fiber laser that includes a $Tm^{3+}$ doped silicate glass fiber, according to the embodiment of the present invention.

Parameters of a $Tm^{3+}/Ho^{3+}$ co-doped silicate glass fiber that can be used with embodiment of the invention are listed in Table 2. The doping concentration is 6 weight-percent of $Tm_2O_3$ and 1 weight-percent of $Ho_2O_3$. The fiber comprises a double cladding with the diameters of the core, first cladding, and second cladding being 10.5, 122, and 160 microns, respectively. The numerical aperture of the core and inner cladding are 0.147 and 0.557 respectively.

TABLE 2

| Glasses | Refractive Index at 589 nm | Doping | Numerical Aperture | Core (μm) | Cladding Diameter. (μm) |
|---|---|---|---|---|---|
| S-G-25 | 1.6294 | 6 wt % $Tm_2O_3$ & 1 wt % $Ho_2O_3$ | 0.149 | 10.5 | |
| First Cladding | 1.6226 | | 0.557 | | 122 |
| Second Cladding | 1.5233 | | | | 160 |

Figure 5:
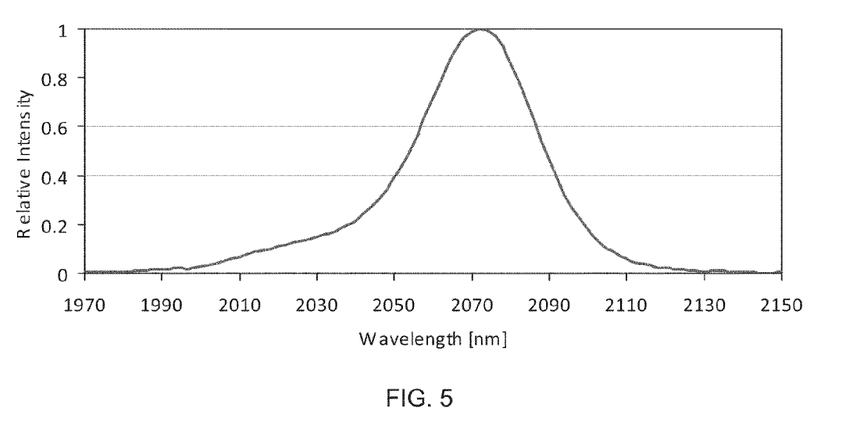
FIG. 5 shows an exemplary spectrum of the amplified emission of holmium ions in a thulium/holmium co-doped optical fiber configured according to an embodiment of the present invention.

FIG. 5 graphically illustrates an amplified spontaneous emission (ASE) of $Ho^{3+}$ ions as a function of wavelength. Emission from 1.90 microns to 2.20 microns can be realized with an embodiment of a fiber laser that employs a $Ho^{3+}$ doped gain-medium optical fiber (depending on the lengths of the gain-medium fiber and the level of pump intensity).

The present invention may be embodied in other specific forms without departing from its spirit or essential characteristics. The described implementations are to be considered in all respects only as illustrative and not restrictive, and various modifications of the disclosed system are intended to be within the scope of the present invention.

Figure 6A:
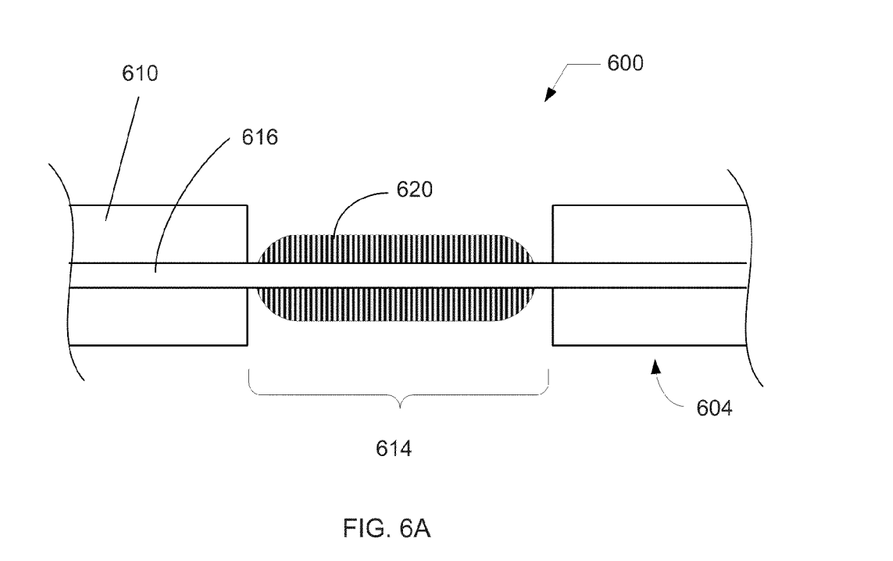
FIGS. 6A and 6B show schematically two respective embodiments of a saturable absorber device according to the present invention.
Figure 6B:
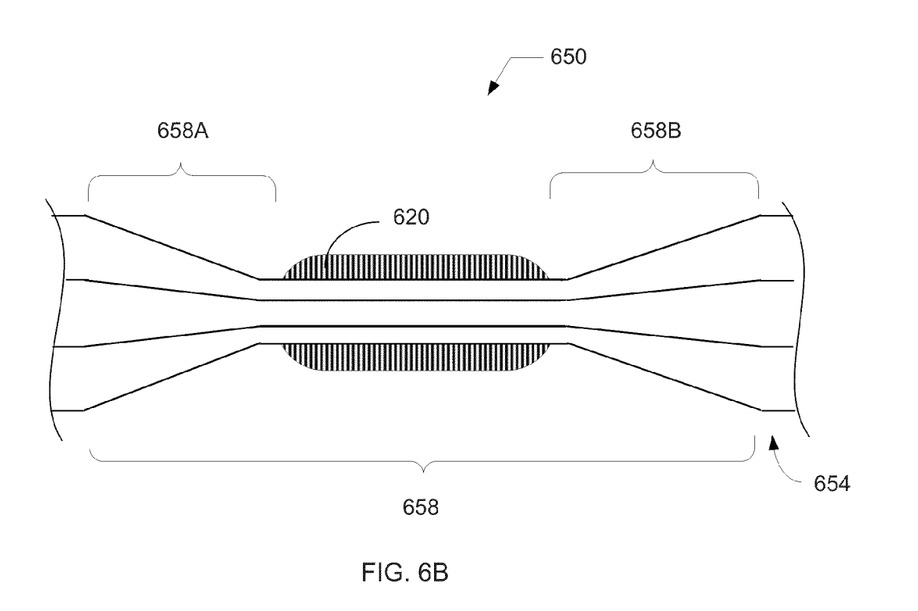

Two specific embodiments of the saturable absorber for the use with an embodiment of the filer laser of the present invention are shown, respectively, in FIGS. 6A and 6B. As shown, the embodiment 600 of FIG. 6A is configured on the basis of an optical fiber 604 the core 612 of which is exposed to the ambient, in a region 614 along the length of the fiber, by removing the fiber cladding 616. The removal of the cladding portion 616 may be accomplished with a technique known in the art, for example by acid etch and polishing. A passive saturable absorber material 620 is then applied to the core 616 of the optical fiber in the exposed region 614 such as to assure that an optical mode of an embodiment of the fiber laser of the invention, propagating through the optical fiber 604, spatially overlap with the region occupied by the absorber material 620b. The saturable absorber material 620 includes a compound made on the basis of an adhesive material (such as epoxy or sol-gel material, for example) that is impregnated with passive saturable absorber components such as, for example, metallic nano-spheres or nano-wires (made of noble metals such as silver, gold, platinum), quantum dots (such as ZnSe or PnS quantum dots, for example), carbon nanotubes, and graphene components that include, for example, one-atom-thick sheets of carbon atoms.

Another specific implementation 650 of the saturable absorber according to the embodiment of the invention is shown in FIG. 6B. Here, the overlap between the laser mode guided by the fiber 654 and the volume occupied by the passive absorber material 620 is achieved by forming a tapered region 658 in the fiber 654 by appropriately pulling the fiber 654 down to a small outer diameter. As shown, the tapered region 658 includes two pulled-down areas 658A, 658B.

Generally, an embodiment of the saturable absorber of the invention is formed in connection with an optical fiber of an embodiment of the fiber laser of the invention. In further reference to FIG. 6A it is appreciated that the exposed region 614 of the fiber 604 may be generally located anywhere along the length of the fiber 604, for example at its end. Similarly, in further reference to FIG. 6B, the tapered region 658 does not have to include two pulled-down areas 658A, 658B: generally, a fiber taper may include only one pulled-down area (not shown). Nor does the tapered region 658 have to be symmetrical.

Figure 7A:
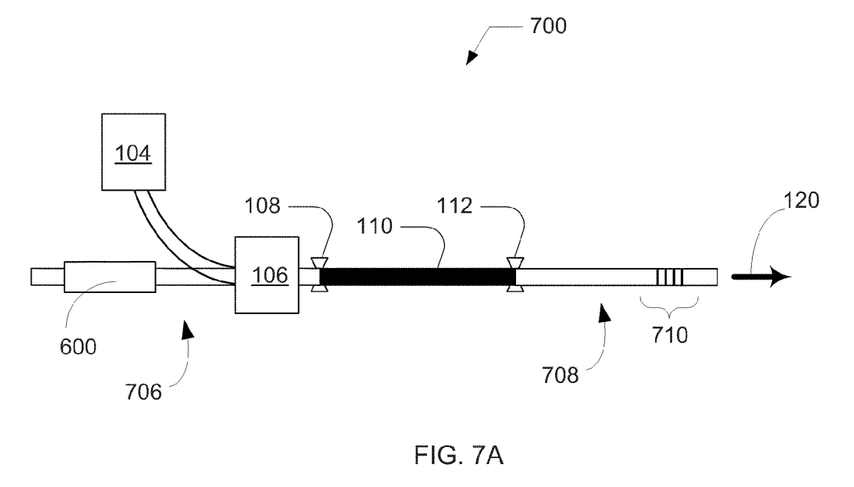
FIGS. 7A, 7B, 7C, and 7D show schematically embodiments of a mode-locked fiber laser system according to the present invention.
Figure 7B:
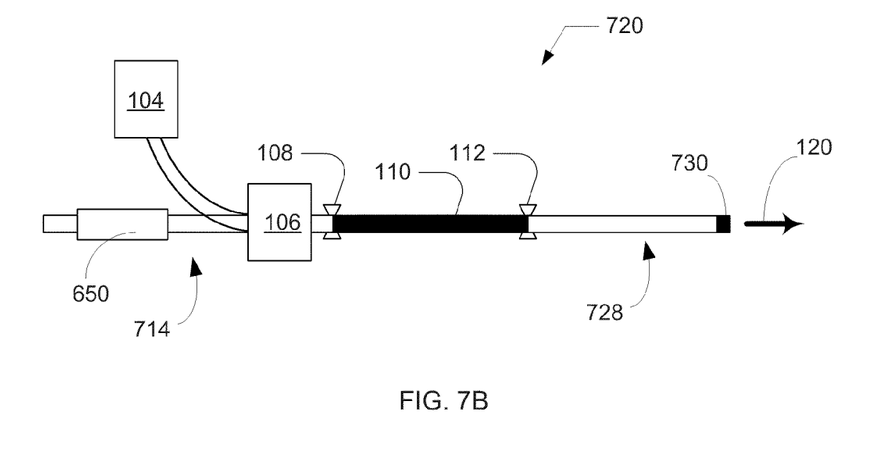
Figure 7C:
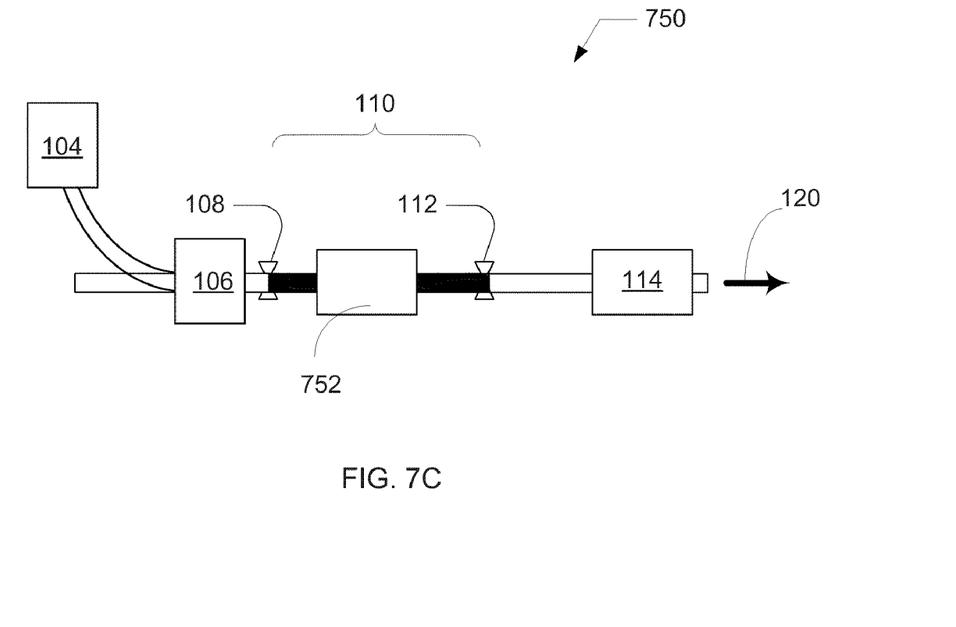
Figure 7D:
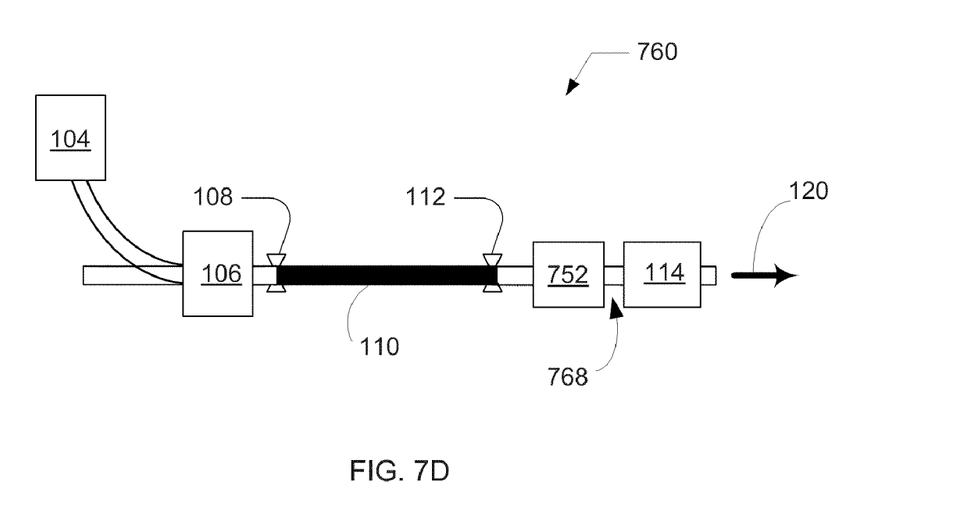

FIGS. 7A, 7B, 7C, and 7D show several exemplary implementations of a fiber laser system according to the invention that are configured differently, according to embodiments of the present invention. FIG. 7A depicts a fiber laser system 700 that includes the gain-medium-forming optical fiber 110 that is fusion-spliced between a passive fiber optic strand 704, having the saturable absorber 706 of FIG. 6A, and another fiber-optic strand 708 having a reflector configured to include a fiber Bragg grating 710. The saturable absorber 706 if adapted to include any embodiment of the saturable absorber discussed in this application, for example, the absorber 600 of FIG. 6A or absorber 650 of FIG. 6B. FIG. 7B shows an alternative embodiment 720, where the gain-medium-forming optical fiber 110 is fusion-spliced between optical fiber strands 724 and 728 that respectively carry the saturable absorber 650 of FIG. 6B and a reflective thin-film stack 730 disposed at the output facet of the fiber 728. As shown in the embodiment 750 of FIG. 7C, a saturable absorber 752 (such as, for example, the absorber 600 or 650) is formed in association with and along the length of the gain-medium-forming optical fiber 110. Yet another alternative embodiment 760, which includes the saturable absorber 752 disposed along an optical fiber 768, carrying the reflector 114, is depicted in FIG. 7D.

Embodiments of the invention can be used as laser sources with various devices and for various applications. For example, they can be used with optical systems disclosed in U.S. patent application Ser. No. 12/778,712, on filed May 12, 2010 and titled "Highly Rare-Earth Doped Fiber Array" and 12/628,914, filed on Dec. 1, 2009 and titled "Highly Rare Earth Doped Fiber." The contents of each of these applications are incorporated by reference herein in their entirety, for all purposes.

The embodiments of the invention described above are intended to be merely exemplary; numerous variations and modifications will be apparent to those skilled in the art. All such variations and modifications are intended to be within the scope of the present invention as defined in any appended claims.

We claim:

1. A mode-locked fiber laser system, comprising
a multicomponent-glass optical fiber doped rare-earth ions of at least one of thulium and holmium and having a length between 0.75 cm and 150 cm, the multicomponent-glass optical fiber being configured as a gain-medium of said fiber laser system, wherein a refractive index of the multicomponent glass of the muticomponent-glass optical fiber is greater than 1.55 at 589 nm,
wherein said fiber laser system is configured to be passively mode-locked with the use of a saturable absorber that includes at least one of metallic nano-spheres, metallic nano-wires, carbon nano-tubes, quantum dots, and graphene components, and
wherein a pulse-repetition rate of said fiber laser system is between 0.1 GHz and 20 GHz.

2. A mode-locked fiber laser system according to claim 1, wherein the saturable absorber includes a saturable absorbing material disposed at an optical fiber section of said fiber laser system, the optical fiber being configured such as to assure that a mode supported by the optical fiber section spatially overlaps with the saturable absorbing material.

3. A mode-locked fiber laser system according to claim 1, wherein the saturable absorber is disposed at an optical fiber having a variable cross-sectional dimension along the length of the optical fiber.

4. A mode-locked fiber laser system according to claim 1, further comprising at least a first optical fiber element that is fusion-spliced with said multicomponent glass optical fiber.

5. A mode-locked fiber laser system according to claim 1, wherein all optical fiber elements of said fiber laser system are fusion-spliced to one another such that light propagating through said system does not propagate in free space.

6. A mode-locked fiber laser system according to claim 1, wherein the saturable absorber is disposed along the length of the multicomponent-glass optical fiber or along the length of the at least a first optical fiber element.

7. A mode-locked fiber laser system according to claim 1, configured to generate laser light at a wavelength between approximately 1.75 microns and 2.2 microns.

8. A mode-locked fiber laser system according to claim 1, wherein said multi-component-glass optical fiber has a length between 1.0 cm and 75 cm and said repetition rate is between 0.2 GHz and 15 GHz.

9. A mode-locked fiber laser system according to claim 1, wherein said multi-component-glass optical fiber has a length between 1.5 cm and 35 cm and said repetition rate is between 0.5 GHz and 10 GHz.

10. A mode-locked fiber laser system, comprising:
a gain medium that includes a multicomponent-glass optical fiber having two ends, a length between 0.75 cm and 150 cm, a refractive index at 589 nm that is greater that 1.55, said multicomponent-glass optical fiber being doped with rare-earth ions of at least one of thulium and holmium at least a first optical fiber fusion-spliced to at least one of the two ends of the multicomponent-glass optical fiber, a pump combiner integrated with the at least a first optical fiber;

a pump laser source configured to deliver light through the pump combiner into the gain medium, and an auxiliary element disposed in optical communication with an optical fiber section of said fiber laser system and containing at least one of a reflector and saturable absorber that includes a saturable absorber base material impregnated with at least one of metallic nano-spheres, metallic nano-wires, carbon nano-tubes, quantum dots, and graphene components.

11. A mode-locked fiber laser system according to claim 10, wherein the reflector includes at least one of an optical thin-film stack, a fiber Bragg grating, and a fiber loop mirror.

12. A mode-locked fiber laser system according to claim 10 configured to generate laser light at a wavelength between approximately 1.75 microns and 2.2 microns.

13. A mode-locked fiber laser system according to claim 10, wherein the length of the multicomponent-glass optical fiber is less than 100 cm.

14. A mode-locked fiber laser system according to claim 10, wherein glass of the multicomponent-glass optical fiber is doped with 5 weight-percent of $Tm_2O_3$ and has a double-cladding.

15. A method for operating a mode-locked fiber laser system comprising:

transmitting light from a pump laser source through at least a first optical fiber element to an optical fiber system including a multicomponent-glass optical-fiber based gain medium that has a length between 0.75 cm and 150 cm, a refractive index at 589 nm of greater than 1.55, and that is doped with rare-earth ions of at least one thulium and holmium:

a saturable absorber disposed at an optical fiber having variable cross-sectional dimension along the length of the optical fiber, the saturable absorber being in optical communication with said gain medium; and a reflector integrated with said gain medium; and partially transmitting light incident onto the reflector to a field-of-view outside the fiber laser system in such a matter as to provide for a pulsed light output, by the optical fiber system, having a repetition rate between 0.1 GHz and 20 GHz.

16. A method according to claim 15, wherein the partially transmitting light incident onto the reflector to a field-of-view outside the fiber laser system includes partially transmitting light at a wavelength between approximately 1.75 microns and 2.2 microns.

17. A method according to claim 15, wherein the at least a first optical fiber element and said multicomponent-glass optical-fiber based gain medium are fusion-spliced to exclude any free space from a cavity of said mode-locked fiber laser system.

18. A method according to claim 15, wherein the transmitting light includes transmitting light through a section of an optical fiber that contains at least one of metallic nano-spheres, metallic nano-wires, carbon nano-tubes, quantum dots, and graphene components in optical communication with light propagating through the gain medium.

19. A method according to claim 15, wherein the transmitting light includes transmitting light through an optical fiber doped with at least one of trivalent holmium and trivalent thulium.

20. A method according to claim 15, wherein the transmitting light includes transmitting light through an optical fiber a material of which contains a network former selected from the group consisting of $SiO_2$, $GeO_2$, $P_2O_5$, $B_2O_3$, and $Al_2O_3$;

a network intermediate including at least one of $B_2O_3$ and $Al_2O_3$; and a network modifier selected from the group consisting of an alkali ion, an alkaline earth ion, and a transition metal ion.

* * * * *